United States Patent Office 3,787,405
Patented Jan. 22, 1974

3,787,405
DIGLYCIDYL COMPOUNDS CONTAINING A N-HETEROCYCLIC RING
Daniel Porret, Binningen, and Willy Fatzer, Bottmingen, Switzerland, assignors to Ciba-Geigy AG, Basel, Switzerland
No Drawing. Filed Nov. 9, 1971, Ser. No. 197,113
Claims priority, application Switzerland, Nov. 18, 1970, 17,022/70
Int. Cl. C07d 49/32, 51/18
U.S. Cl. 260—260     5 Claims

ABSTRACT OF THE DISCLOSURE

Diglycidyl esters are produced by the reaction, in a known manner, of dicarboxylic acids of mononuclear N-heterocyclic compounds, e.g. N,N' - bis - (β - carboxyethyl) - 5,5 - dimethylhydantoin, with epihalogenhydrin, e.g. with epichlorohydrin.

Example: The new compound

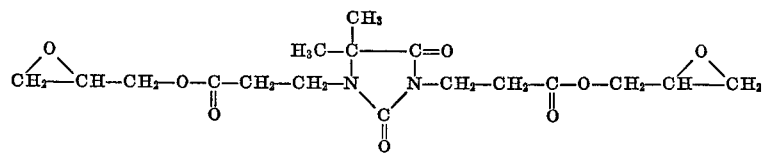

The new diglycidyl esters can be easily cured with all known epoxide resin curing agents, and are suitable for the production of moulded shapes possessing good mechanical properties.

---

The present invention relates to new diglycidyl esters of the general formula:

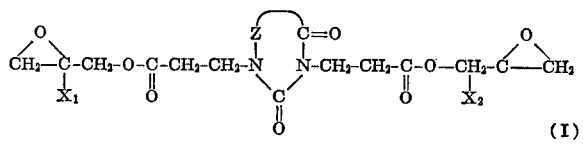

(I)

wherein $X_1$ and $X_2$ each represent a hydrogen atom or a methyl group; and Z represents a nitrogen-free bivalent radical which is necessary for the completion of a five- or six-membered, unsubstituted or substituted, heterocyclic ring.

The radical Z in Formula I consists preferably only of carbon and hydrogen, or of carbon, hydrogen and oxygen. It can be, e.g. a radical of the formulae:

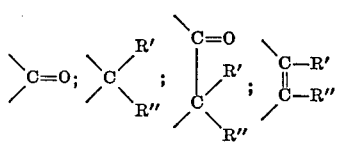

or

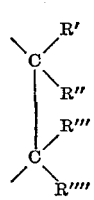

wherein R', R", R''', and R'''' can each represent, independently of each other, a hydrogen atom or, e.g. an alkyl radical, an alkenyl radical, a cycloalkyl radical, or an optionally substituted phenyl radical.

The new diglycidyl esters of Formula I can be produced by the reaction in a known manner, in one or more stages, of dicarboxylic acids of the general formula:

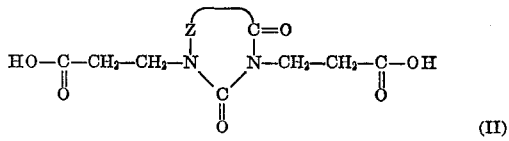

(II)

wherein Z has the same meaning as in Formula I with an epihalogenhydrin, or a β-methylepihalogenhydrin such as, e.g. epichlorohydrin, β-methylepichlorohydrin, or epibromohydrin.

In the case of the single-stage process, the reaction of epihalogenhydrin with a compound of Formula II is performed in the presence of alkali, the alkali preferably used being sodium or potassium hydroxide. In this single-stage process, the epichlorohydrin being reacted according to the process can be completely or partially substituted by dichlorohydrin, which is converted in an intermediate step, under the conditions of the process and with a corresponding alkali addition, to epichlorohydrin, reacting then as such with the dicarboxylic acid of Formula II. With respect to the preferably applied two-stage process, the compound of Formula II is, in the first stage, added with an epihalogenhydrin, in the presence of acid or basic catalysts, to the halogenhyldrin ester, this being subsequently dehydrohalogenated in the second stage, by means of alkalis such as potassium or sodium hydroxide, to the glycidyl ester.

The new glycidyl esters of Formula I according to the invention are preferably produced by the reaction of an epihalogenhydrin, preferably epichlorohydrin, in the presence of a basic catalyst, such as preferably a tertiary amine or a quaternary ammonium base or a quaternary ammonium salt, with a compound of Formula II, the obtained product containing halogenhydrin groups being then treated with agents eliminating halogen hydride.

Particularly suitable catalysts for the addition of epichlorohydrin are tertiary amines such as triethylamine, tri-n-propylamine, benzyldimethylamine, N,N-dimethylaniline and triethanolamine; quaternary ammonium bases such as benzyltrimethylammonium hydroxide; quaternary ammonium salts such as tetramethylammonium chloride, tetraethylammonium chloride, benzyltrimethylammonium chloride, benzyltrimethylammonium acetate, methyltriethylammonium chloride; also ion exchanger resins having tertiary or quaternary amino groups; also trialkylhydrazonium salts such as trimethylhydrazonium iodide.

Further catalysts which are suitable are low molecular thio ethers and sulphonium salts, or compounds which can pass over with the epihalogenhydrins into thio ethers or into sulphonium compounds, such as hydrogen sulphide, sodium sulphide, or mercaptans.

Examples of such thioethers and sulphonium salts are: diethyl sulphide, β-hydroxyethyl ethyl sulphide, β-hydroxypropylethyl sulphide, ω-hydroxy-tetramethyleneethyl sulphide, thiodiglycol, mono-β-cyanoethylthioglycol ether, dibenzyl sulphide, benzyl ethyl sulphide, benzyl butyl sulphide, trimethyl sulphonium iodide, tris(β-hydroxyethyl)sulphonium chloride, dibenzyl methyl sulphonium bromide, 2,3-epoxypropyl methyl ethyl sulphonium iodide, dodecylmethyl sulphide, dithiane.

For dehydrohalogenation are used, as a rule, strong alkalis such as anhydrous sodium hydroxide, or aqueous sodium hydroxide solution; but it is also possible to use other alkaline reagents such as potassium hydroxide, barium hydroxide, calcium hydroxide, sodium carbonate or potassium carbonate.

Dehydrohalogenation can, for its part, be performed in several stages. The process can entail firstly treatment at elevated temperature with solid sodium or potassium hydroxide and then, after the excess epihalogenhydrin has been distilled off, heating in an inert solvent with an excess of concentrated alkali hydroxide solution, e.g. 50% sodium hydroxide solution.

Suitable epihalogenhydrins are epibromohydrin, β-methylepichlorohydrin and, in particular, epichlorohydrin. Good yields are obtained by the use of an excess of epichlorohydrin, and preferably 4 to 40 moles of epichlorohydrin per hydroxyl or NH— group. During the first reaction stage, before the addition of alkali, there already occurs a partial epoxidation of the bischlorohydrin ether of a compound of Formula II. The epichlorohydrin, which acts as a hydrogen chloride acceptor, is thereby partially converted into glycerin dichlorohydrin. This is then regenerated, during the treatment with alkali, to form again epichlorohydrin.

The dicarboxylic acids of the General Formula II are obtained in a known manner by the cyanoethylation of mononuclear N-heterocyclic compound of the general formula:

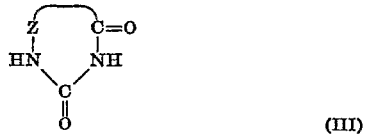

(III)

wherein Z has the same meaning as in Formula I by the addition of acrylonitrile, the obtained di-(β-cyanoethyl)-derivatives being then hydrolyzed to dicarboxylic acid; this occurs readily and in good yield. The dicarboxylic acids of Formula II are normally solids, which can be purified by recrystallization.

The mononuclear N-heterocyclic compounds of Formula III used for the production of dicarboxylic acids of Formula II are, in particular, hydantoin, hydantoin derivatives, barbituric acid, barbituric acid derivatives, uracil, uracil derivatives, dihydrouracil and dihydrouracil derivatives, also parabanic acid.

The hydantoin and its preferred derivatives correspond to the general formula:

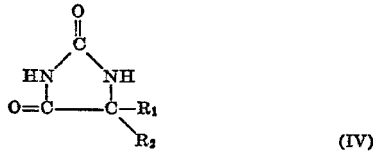

(IV)

whereby $R_1$ and $R_2$ each represent a hydrogen atom, or a lower alkyl radical having 1 to 4 carbon atoms, or wherein $R_1$ and $R_2$ together form a tetramethylene or pentamethylene radical. Mention is made of: hydantoin, 5-methylhydantoin, 5-mehtyl-5-ethylhydantoin, 5-n-propylhydantoin, 5-isopropylhydantoin, 1,3-diaza-spiro(4.5)-decane-2,4-dione, 1,3-diazo-spiro(4.4)-nonane - 2,4 - dione, and preferably 5,5-dimethylhydantoin.

The barbituric acid and its preferred derivatives correspond to the general formula:

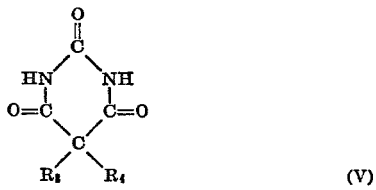

(V)

wherein $R_3$ and $R_4$ each represent, independently of each other, a hydrogen atom, an alkyl radical, an alkenyl radical, a cycloalkyl or -alkenyl radical, or a substituted or unsubstituted phenyl radical.

The following are mentioned:

barbituric acid,
5-ethylbarbituric acid,
5,5-diethylbarbituric acid,
5-ethyl-5-butylbarbituric acid,
5-ethyl-5-sec-butylbarbituric acid,
5-ethyl-5-isopentylbarbituric acid,
5,5-diallylbarbituric acid,
5-allyl-5-isopropylbarbituric acid,
5-allyl-5-sec.-butylbarbituric acid,
5-ethyl-5-(1'-methylbutyl)barbituric acid,
5-allyl-5-(1'-methylbutyl)barbituric acid,
5-ethyl-5-phenylbarbituric acid,
5-ethyl-5-(1'-cyclohexen-1-yl)barbituric acid.

Uracil and its preferred derivatives correspond to the general formula:

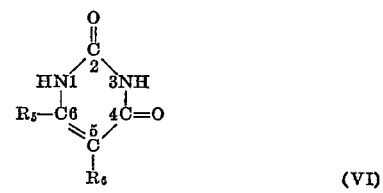

(VI)

wherein $R_5$ and $R_6$ both represent hydrogen, or one of the two radicals represents a hydrogen atom and the other radical a methyl group.

Uracils of Formula VI are uracil itself, and also 6-methyluracil and thymine (=5-methyluracil).

Dihydrouracil (=2,4-dioxohexahydropyrimidine) and its preferred derivatives correspond to the general formula:

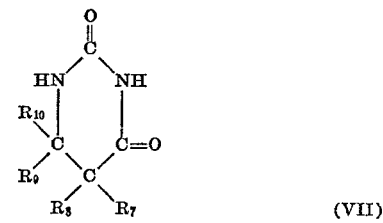

(VII)

wherein $R_7$ and $R_8$ both represent a hydrogen atom, or identical or different alkyl radicals, preferably alkyl radicals having 1 to 4 carbon atoms; and $R_9$ and $R_{10}$ each represent, independently of each other, a hydrogen atom or an alkyl radical.

Preferably, in the above formula, the two radicals $R_7$ and $R_8$ represent methyl groups, $R_9$ represents a hydrogen atom or a lower alkyl radical having 1 to 4 carbon atoms, and $R_{10}$ a hydrogen atom. Mention is made of:

5,6-dihydrouracil,
5,5-dimethyl-5,6-dihydrouracil (2,4-dioxo-5,5-dimethyl-hexahydropyrimidine) and
5,5-dimethyl-6-isopropyl-5,6-dihydrouracil (2,4-dioxo-5,5-dimethyl-6-isopropylhexahydropyrimidine).

The new diglycidyl esters of Formula I according to the invention react with the usual curing agents for polyepoxide compounds, and they can therefore be crosslinked and cured by the addition of such curing agents in an analogous manner to that used for other polyfunctional epoxide compounds and epoxide resins. Basic or acid compounds are applicable as curing agents.

Mentioned as suitable curing agents are, e.g.: amines or amides, such as aliphatic, cycloaliphatic or aromatic, primary, secondary and tertiary amines, e.g. monoethanolamine, ethylenediamine, hexamethylenediamine, trimethylhexamethylenediamine, diethylenetriamine, triethylenetetramine, tetraethylenepentamine, N,N-dimethylpropylenediamine-1,3, N,N-diethylpropylenediamine-1,3, bis(4-amino-3-methylcyclohexyl)-methane, 3,5,5-trimethyl-3-(aminomethyl)cyclohexylamine ("isophoronediamine"), Mannich bases such as 2,4,6-tris(dimethylaminomethyl)- phenol; m-phenyldiamine, p-phenylenediamine, bis(4-aminophenyl)methane, bis(4-aminophenyl)sulphone, m-xylylenediamine; N-(2-aminoethyl)piperazine; adducts of acrylonitrile or monoepoxides, such as ethylene oxide or propylene oxide, with polyalkylenepolyamines, such as diethylenetriamine or triethylenetetramine; adducts from polyamines, such as diethylenetriamine or triethylenetetramine, in excess and polyepoxides such as diomethanepolyglycidyl ethers; ketimines, e.g. from acetone or methyl ethyl ketone and bis(p-aminophenyl)-methane; adducts from monophenols or polyphenols and polyamines; polyamides, especially those from aliphatic polyamines such as diethylenetriamine or triethylenetetramine, and di- or trimerizated unsaturated fatty acids such as dimerizated linseed oil fatty acid ("Versamid"); polymeric polysulphides ("Thiokol"); dicyanodiamide, aniline/formaldehyde resins; polyvalent phenols, e.g. resorcin, 2,2-bis-(4-hydroxyphenyl)-propane or phenol/formaldehyde resins; boron trifluoride and complexes thereof with organic compounds such as $BF_3$-ether complexes and $BF_3$-amine complexes, e.g. $BF_3$-monoethylamine complex; acetoacetanilide-$BF_2$-complex; phosphoric acid; triphenyl-phosphite; polybasic carboxylic acids and their anhydrides, e.g. phthalic acid anhydride, $\Delta^4$-tetrahydrophthalic acid anhydride, hexahydrophthalic acid anhydride, 4-methylhexahydrophthalic acid anhydride, 3,6-endomethylene-$\Delta^4$-tetrahydrophthalic acid anhydride, methyl-3,6-endomethylene-$\Delta^4$-tetrahydrophthalic acid anhydride (=methylnadicananhydride), 3,4,5,6,7,7-hexachloro-3,6-endomethylene-$\Delta^4$-tetrahydrophthalic acid anhydride, succinic acid anhydride, adipic acid anhydride, azelaic acid anhydride, sebacic acid anhydride, maleic acid anhydride, dodecenylsuccinic acid anhydride; pyromellitic acid dianhydride, or mixtures of such anhydrides.

In the curing process, it is also possible to use curing accelerators; with the use of polyamides, dicyanodiamide, polymeric polycarboxylic acid anhydrides as curing agents, suitable accelerators are, e.g. tertiary amines, their salts or quaternary ammonium compounds, e.g. 2,4,6-tris-(dimethylaminomethyl) - phenol, benzyldimethylamine, 2-ethyl-4-methyl-imidazole, 4 - aminopyridine, triamylammonium phenolate; also alkali metal alcoholates, such as, e.g. sodium hexanetriolate. In the case of amine curing, it is possible to use as accelerators, e.g. mono- or polyphenols such as phenol or diomethane, salicylic acid or thiocyanates.

Optionally, use can also be made of known reactive diluents such as, e.g. styrene oxide, butylglycidyl ether, isoctylglycidyl ether, phenylglycidyl ether, cresylglycidyl ether, glycidyl esters of synthetic, highly-branched, and in the main tertiary aliphatic monocarboxylic acids ("Cardura E").

The expression "curing," as it is employed here, means the transformation of the aforesaid diepoxides into insoluble and unmeltable, cross-linked products, this occurring, as a rule, with the simultaneous moulding of the material to give moulded shapes such as cast objects, pressed objects, or laminates and such like, or to give "flat-shaped articles" such as coatings, lacquer films, or bonds (adhesives).

Depending on the choice of curing agent, curing can be carried out at room temperature (18–25° C.), or at elevated temperature (e.g. 50–180° C.).

The curing operation can optionally be performed also in two stages by firstly prematurely interrupting the curing reaction, or by carrying out the first stage at only moderately elevated temperature, whereupon a curable precondensate (known as the "B-stage") which is still meltable and soluble is obtained from the epoxide component and the curing-agent component. Such a precondensate can be used, e.g. for the production of "prepregs," moulding materials or sinter powders.

The present invention also relates, therefore, to curable mixtures which are suitable for the production of moulded articles, including flat-shaped articles, and which contain the diglycidyl esters according to the invention, optionally together with other di- or polyepoxide compounds, and also curing agents for epoxy resins, such as polyamines or polycarboxylic acid anhydrides.

To the diepoxides according to the invention, or to mixtures thereof with other polyepoxide compounds and/or curing agents, it is possible to add before curing, in any particular phase, the usual modifying agents such as extenders, fillers and toughening agents, pigments, dyestuffs, organic solvents, softeners, flow control agents, thixotropic agents, fire-retarding agents, and mould-release agents.

Examples of extenders, toughening agents, fillers and pigments which can be used in the curable mixtures according to the invention are as follows: coal tar, bitumen, textile fibres, glass fibres, asbestos fibres, boron fibres, carbon fibres, cellulose, polyethylene powders, polypropylene powders; quartz flour; mineral silicates such as mica, asbestos flour, slate flour; kaolin, aluminum oxide trihydrate, chalk flour, gypsum, antimonous trioxide, bentone, silicic acid aerogel ("Aerosil"), lithopone, heavy spar, titanium dioxide, soot, graphite, oxide dyes such as iron oxide or metal powder such as aluminum powder or iron powder.

Suitable organic solvents for the modification of the curable mixtures are, e.g. toluene, xylene, n-propanol, butylacetate, acetone, methyl ethyl ketone, diacetone alcohol, ethylene glycol monomethyl ether, -monoethyl ether and -monobutyl ether.

As softeners for the modification of the curable mixtures it is possible to use, e.g. dibutyl-, dioctyl- and dinonylphthalate, tricresylphosphate, trixylenephosphate, and also polypropylene glycols.

As flow control agents on application of the curable mixtures, especially in the case of surface protection, it is possible to add, e.g. silicones, cellulose acetobutyrate, polyvinylbutyral, waxes, stearates (which in some cases are also used as mould-release agents).

Specially for application in the lacquer field, it is also possible for the diepoxide compounds to be partially esterified, in a known manner, with carboxylic acids such as, in particular, higher unsaturated fatty acids. It is moreover possible to add to such lacquer-resin compositions other curable synthetic resins, e.g. phenoplasts or aminoplasts.

The curable mixtures according to the invention can be produced, in the usual manner, with the aid of the usual mixing aggregates (stirrer, kneader, rollers).

The curable epoxide resin mixtures according to the invention are used, in particular, in the field of surface protection, in electrical engineering, for laminating processes, and in the building industry. They can be used in the form best suited for the purpose for which they are required, e.g. in the loaded or unloaded condition, optionally in the form of solutions or emulsions, as coating agents, lacquers, as moulding materials, sinter powders, dip resins, casting resins, injection-moulding compositions, impregnation resins and bonding agents, adhesives, as tool resins, laminating resins, sealing materials and fillers, floor-covering materials, and bonding agents for mineral aggregates.

Where otherwise not stated in the following examples, the term "parts" denotes parts by weight, and percentages signify percent by weight. Parts by volume and parts by weight have the same ratio to each other as millimeter and gram.

With regard to the mechanical and electrical properties of the curable mixtures described in the following examples, plates of the size 92 x 41 x 12 mm. were prepared for the determination of bending strength, deflection impact strength and water absorption. The specimens (60 x 10 x 4 mm.) for the determination of water absorption and for the bending and impact test (VSM 77103 and VSM 77105) were taken from the plates.

For determination of dimensional stability in the heat according to Martens (DIN 53,458), specimens were cast in each case having the dimensions 120 x 15 x 10 mm.

Plates of the dimensions 120 x 120 x 4 mm. were cast for the testing or arc resistance and tracking resistance (VDE 0303).

(A) PRODUCTION EXAMPLES

Example 1

A solution of 190 g. of 1,3-bis-(β-carboxyethyl)-5,5-dimethylhydantoin (0.7 mole) in 1295 g. of epichlorohydrin (14 moles) is stirred at 90° C. whilst 2.0 g. of 50% aqueous tetramethylammonium chloride solution are added; a pH-value of 4.3, measured on a glass electrode, is thereby obtained. Stirring is continued for 50 minutes under the stated conditions, whereupon an increase in the pH-value to 9.7 is observed.

An azeotropic circulatory distillation is then performed with a bath temperature of 140° C. so that, with a vacuum of 80–90 torr, a reaction temperature of 60° C. obtains; a vigorous circulatory distillation is consequently established. An addition is then made dropwise over a period of 4 hours, with vigorous stirring, of 140 g. of 50% aqueous sodium hydroxide solution, the water present in the reaction mixture being azeotropically entrained and separated. After completion of the addition of sodium hydroxide solution, distillation is continued for a further 60 minutes for the removal of the last traces of water.

The reaction mixture is cooled to room temperature, and the sodium chloride removed by filtration; to effect the removal of sodium chloride and the residues of the sodium hydroxide solution, the reaction mixture is extracted by shaking with 200 ml. of water and, after separation of the aqueous phase in a rotary evaporator, concentrated at 60° C. under a water-jet vacuum. Drying is subsequently carried out at 90° C./0.2 torr until constant weight is obtained.

In this manner are obtained 242 g. of a yellowish clear resin (yield: 90.3% of the theoretical amount) having an epoxide content of 4.67 equivalents/kg. (corresponding to 89.8% of the theoretical amount). The total chlorine content amounts to 1.55% and the viscosity at 25° C. is 100 cp. The product consists essentially of the diglycidyl ester of the following structure:

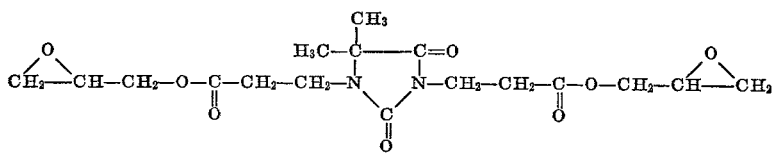

Example 2

In the manner described in Example 1, 143 g. of 1,3-bis-(β-carboxyethyl)-5-methyl - 5 - ethylhydantoin (0.5 mole) are reacted with 1387.5 g. of epichlorohydrin (=1176 ml.) (15 moles), in the presence of 2.5 g. of tetraethylammonium chloride. Dehydrohalogenation is performed in the way described in Example 1 with 150 g. of 50% aqueous sodium hydroxide solution, under the conditions described in the said example.

After a working up procedure as outlined in Example 1, 172 g. of a light-brown, low-viscous resin are obtained (yield: 86.1% of theory) with an epoxide content of 4.76 epoxide equiv./kg. (94.8% of the theoretical amount). The chlorine content (total chlorine) amounts to 0.7%, of which half is ionogenic chlorine.

The product consists essentially of the diglycidyl ester of the formula:

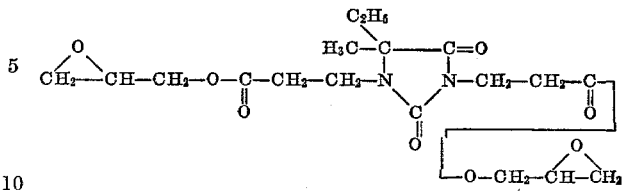

Example 3

In the manner described in Example 1, a solution of 281.1 g. of 1,3-bis-(β-carboxyethyl)-5,5-pentamethylenehydantoin (0.9 mole), 1665 g. of epichlorohydrin (18 moles) and 4.5 g. of tetramethylammonium chloride is reacted with 180 g. of 50% aqueous sodium hydroxide solution (2.25 moles). Dehydrohalogenation and processing are carried out exactly as described in Example 1. Thus obtained are 350 g. (yield: 91.6% of the theoretical amount) of a light-red, clear viscous resin having an epoxide content of 4.23 equivalents/kg., the total chlorine content of which is 1.63%.

The product consists essentially of the diglycidyl ester of the following formula:

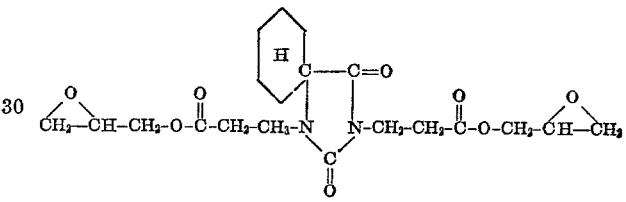

Example 4

With the procedure as described in Example 1, 28.6 g. of 1,3-bis-(β-carboxyethyl)-5,5-dimethyl - 5,6 - dihydrouracil (0.1 mole) are reacted with 185 g. of epichlorohydrin (2.0 moles) in the presence of 0.4 g. of tetramethylammonium chloride. Dehydrohalogenation is performed according to Example 1 with 20 g. of 50% aqueous sodium hydroxide solution, under the conditions described in the said example. In this manner are obtained 35.7 g. of a yellow viscous resin (yield: 89.7% of the theoretical amount) having an epoxide content of 4.41 epoxide equivalents/kg. (87.8% of the theoretical amount). The total chlorine content amounts to 1.4%. The product consists essentially of the diglycidyl ester of the formula:

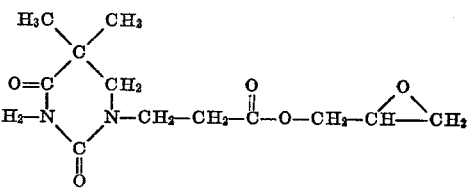

(B) APPLICATION EXAMPLES

Example I

An amount of 60 g. of the diglycidyl ester produced according to Example 1 and having an epoxide content of 4.67 epoxide equivalents/kg. is mixed with 36.6 g. of hexahydrophthalic acid anhydride at 80° C. to form a clear and homogeneous melt. This mixture is then poured into aluminum moulds preheated to 80° C. and cured according to the following cycle: 3 hours/80° C. and 2 hours/100° C. and 20 hours/150° C. The thus obtained clear transparent, light-brown colored moulded specimens possess the following properties:

Bending strength (VSM 77103)  13.6–14.3 kp./mm.²
Deflection (VSM 77103) _____ 12.6–15.9 mm.
Impact strength (VSM 77105) _ 11.0–18.6 cm. kp./cm.²
Mech. dimensional stability in the heat according to Martens (DIN 53,458) _____ 73° C.
Boiling water absorption (1 hour/100° C.) _____ 1.64%.
Tracking resistance (VDE 0303) _____ Ka 3c (stage).
Arc resistance (VDE 0303) __ L 4 (stage).

Example II

In the manner described in Example I, 100 g. of the diglycidyl ester produced according to Example 2 having an epoxide content of 4.76 epoxide equivalents are worked up with 62.2 g. of hexahydrophthalic acid anhydride.

Curing is carried out according to the following cycle: in 4 hours at 120° C. and 20 hours at 150° C. The thus obtained cast specimens possess the following properties:

Bending strength (VSM 77103)  13–15 kp./mm.²
Deflection (VSM 77103) _____ 11–13.5 mm.
Impact strength (VSM 77103) _ 10.6–12.0 cm. kp./cm.²
Dimensional stability in the heat according to Martens (DIN) _ 60° C.
Boiling water absorption (1 hour/100° C.) _____ 1.17%.
Tracking resistance (VDE) ___ KA 3c (stage).
Arc resistance (VDE) _____ L 4 (stage).

Example III

An amount of 100 g. of the diglycidyl ester produced according to Example 3 having an epoxide content of 4.23 epoxide equivalents/kg. is processed with 55.8 g. of hexahydrophthalic acid anhydride, analogously to the manner described in Example II, to produce cast specimens. The thus obtained moulded specimens possess the following properties:

Bending strength (VSM 77103)  16.2–17.5 kp./mm.²
Deflection (VSM 77103) _____ 8.7–10.6 mm.
Impact strength (VSM 77103) __ 10.0–11.3 cm. kp./cm.²
Dimensional stability in the heat according to Martens (DIN) _____ 82° C.
Cold water absorption (4 days/ 20 C.) _____ 1.01%.
Tracking resistance (VDE) ___ KA 3c/KA 3b (stage).
Arc resistance (DIN) _____ L 4 (stage).

What we claim is:
1. A diglycidyl ester of the formula:

wherein $X_1$ and $X_2$ each represent a hydrogen atom or a methyl group; and Z is a group having the formula:

wherein R', R'' independently of each other represent hydrogen, a lower alkyl or together are tetramethylene or pentamethylene, or wherein R', R'', R''', and R'''' independently of each other represent hydrogen or a lower alkyl.

2. The diglycidyl ester according to claim 1 of the formula:

3. The diglycidyl ester according to claim 1 of the formula:

4. The diglycidyl ester according to claim 1 of the formula:

5. The diglycidyl ester according to claim 1 of the formula:

References Cited
UNITED STATES PATENTS

| | | | |
|---|---|---|---|
| 3,391,079 | 7/1968 | Williamson | 260—309.5 |
| 3,449,353 | 6/1969 | Porret et al. | 260—309.5 |
| 3,542,803 | 11/1970 | Porret | 260—309.5 |
| 3,591,590 | 7/1971 | Haug et al. | 260—260 |
| 3,592,823 | 7/1971 | Porret | 260—309.5 |
| 3,629,263 | 12/1971 | Batzer et al. | 260—309.5 |
| 3,644,365 | 2/1972 | Habermeier et al. | 260—260 |
| 3,676,455 | 7/1972 | Haug et al. | 260—309.5 |
| 3,679,681 | 7/1972 | Habermeier et al. | 260—309.5 |

NATALIE TROUSOF, Primary Examiner

U.S. Cl. X.R.

260—2 EP, 2 EA, 2 N, 2 EC, 13, 18 EP, 30.4 EP, 30.6 R, 31.8 E, 37 EP, 78.4 EP, 257, 309.5, 824 EP, 830 P, 830 TW, 830 S, 830 R, 831, 834, 836